United States Patent [19]
Ross

[11] Patent Number: 4,501,690
[45] Date of Patent: Feb. 26, 1985

[54] PROCESS FOR TREATING RADIOACTIVE SALT CAKE

[76] Inventor: Donald R. Ross, 2329 N. Recker Rd. #19, Mesa, Ariz. 85205

[21] Appl. No.: 423,116

[22] Filed: Sep. 24, 1982

Related U.S. Application Data

[62] Division of Ser. No. 127,452, Mar. 5, 1980.

[51] Int. Cl.³ ............................................... G21F 9/16
[52] U.S. Cl. ..................................... 252/628; 252/632
[58] Field of Search ........................ 252/628, 629, 632

[56] References Cited

U.S. PATENT DOCUMENTS 3,116,131 12/1963 Beerman .............................. 252/629
3,249,551 5/1966 Bixby .................................. 252/629

Primary Examiner—Deborah L. Kyle
Attorney, Agent, or Firm—Thomas W. Secrest

[57] ABSTRACT

This invention is directed to a method and an apparatus to heat certain particles. These certain particles are heated to make them more desirable. In the heating of these particles, it is often desirable to expand the particles to make a light-weight aggregate. The light-weight aggregate may be used in making a building material or the like. In carrying out the process of heating these particles, there is used air for combustion of the combustible fuel and only a minimum of air for carrying of the particles or expansion of the particles.

3 Claims, 18 Drawing Figures

PROCESS FOR TREATING RADIOACTIVE SALT CAKE

This application is a divisional patent application of the original copending application which was filed on Mar. 5, 1980 in the name of Donald R. Ross, Ser. No. 127,452, and entitled An Apparatus and Method for Heating a Material.

The parent patent application entitled, Process For Calcining a Material, was filed on Apr. 14, 1977 under Ser. No. 787,713 and matured into U.S. Pat. No. 4,263,163, issuing date of Apr. 21, 1981; there was a co-pending application Ser. No. 127,473, filing date of Mar. 5, 1980 which matured into U.S. Pat. No. 4,389,332, issuing date of June 21, 1983; there was a co-pending patent application Ser. No. 127,535, filing date of Mar. 5, 1980, now abandoned, which was co-pending with the parent application and with patent application Ser. No. 127,535; there was a co-pending divisional patent application Ser. No. 421,998, filing date of Sept. 23, 1982; there was a divisional patent application Ser. No. 127,451, filing date of Mar. 5, 1980, now abandoned, and which divisional patent application was co-pending with the parent patent application, and there is a continuation-in-part co-pending patent application Ser. No. 406,705, filing date of Aug. 9, 1982 and which patent application was co-pending with Ser. No. 127,451; there is a divisional patent application Ser. No. 127,452, filing date of Mar. 5, 1980, and which patent application was co-pending with the parent patent application and there is also a divisional patent application Ser. No. 423,116, filing date of Sept. 24, 1982 which is co-pending with patent application Ser. No. 127,452; there was a patent application Ser. No. 127,486, filing date of Mar. 5, 1980, now abandoned, and which patent application was co-pending with the parent patent application and there is a divisional patent application Ser. No. 429,129, filing date of Sept. 30, 1982 and which was co-pending with the divisional patent application Ser. No. 127,486.

THE GENERAL BACKGROUND OF THE INVENTION

For, approximately, twenty-five years, certain materials, such as zeolite, vermiculite, perlite, and the like have been expanded into light-weight aggregates. Since 1946, there has been developed apparatus and methods for expanding these certain materials. These materials are given a heat treatment in the range of about 700° F. to about 3000° F. to process them into expanded solid particles. A material which may be used for illustrative purposes is perlite.

Perlite is an aluminal-silicate mineral that is non-crystaline and glasslike in its nature. When perlite ore is ground to the approximate particle size of sand, it has a density of about 75 lbs. per cubic foot, although this density can vary somewhat. Perlite contains a small amount of sodium oxide and potassium oxide which acts as a flux and reduces the melting point of the mixture of the perlite and the oxide. Also, there is a small percentage of chemically combined water in the perlite. When high temperature is applied to a perlite particle, the surface softens and the water turns to steam causing the perlite particle to expand. The average density of the expanded perlite particle is 8 lbs. per cubic foot, although it is possible to get the density as low as 3 or 4 lbs. per cubic foot. The particle size of the expanded product is controlled, to a degree, by the particle size of the ore. The various markets for expanded perlite particles are, essentially, controlled by the particle size of the expanded product.

The perlite ore is mined by open pit methods, either drill and blast, or in some cases, dug, directly, with large bulldozers and rippers. The ore is then transported to a mill where the rock is crushed, ground, dried, and screened to various particle size ranges to meet specifications for various markets. The finished ore is then shipped by covered hopper cans all over the country to expanding plants where it is heated and expanded into its final form and distributed from these plants. The ore presently used comes from five states: New Mexico, Colorado, Arizona, California, and Idaho. Probably, 85% of the ore is mined at No Agua, N.M., and shipped from Antonito, Colo. the closest rail head.

At the present time, the largest particle size of perlite ore used for expansion purposes is about 150" in diameter. The largest expanded perlite particle does not exceed about ⅜" in diameter.

The perlite industry received its start toward the end of World War II. In the formative years of the perlite industry, three types of furnaces were developed for expanding the perlite ore to form expanded perlite particles. These three types of furnaces were the stationary horizontal furnace, rotary furnace, and vertical furnace.

The vertical furnace is by far the most popular design. The rotary furnace is next in popularity with the stationary horizontal furnace being third in popularity. The vertical furnace is capable of heating and expanding all gradations of ore. The rotary furnace works best on coarse ore. The horizontal stationary furnace is used on fine ores.

The vertical furnace comprises a vertical tube. A burner is placed at the bottom of the tube looking upwardly and a draft is provided by a fan downstream from the vertical tube. The ore is dropped directly into the flame about midway of the tube. The particles fall down, downwardly, and due to the heat in the vertical tube, the particles are heated and start to expand. With expansion, the density of the particles decreases, and the rate of fall in the vertical furnace slows. Then, when the particles have expanded, sufficiently, the density of the particles decreases and the force of gravity on the particles is overcome by the upward draft in the furnace and the particles reverse their direction and exit out the top of the vertical furnace or vertical tube. These expanded particles are carried, pneumatically, to a collector, such as a cyclone or bag house and collected.

The rotary furnace is, essentially, a set of concentric cylinders that are set, horizontally, and rotate in the same manner as the rotary kiln. There are three cylinders, one inside the other. The ore is fed into the annular space between the inside cylinder and the center cylinder. The ore is preheated in this space. The preheated ore is then fed into the inside cylinder. This inside cylinder has a burner mounted in it that provides the heat. As the ore expands, the lighter expanded particles enter into the airstream passing through the furnace and are carried out of the furnace. The heavier particles are expanded into the expanded particles and put into the airstream at the end of the furnace. The expanded particles are collected in a fashion similar to that with a vertical furnace in that these particles can be collected in a cyclone or bag house.

The horizontal stationary furnace comprises a cylinder and has a burner to supply heat. The fine solid particles are introduced into this cylinder and heated to expand the fine particles. An airstream passes through the horizontal cylinder and the expanded particles, which have a low density, are carried out of the furnace in tha airstream and collected in a bag house or a cyclone.

The source of heat or the source of heat energy is a gas, such as natural gas. This gas is burned to supply the heat energy which is used to expand the solid particles. There is also used liquified petroleum gas or a mixture of propane-butane. The quantity of heat energy required to heat a ton of solid perlite particles to form an expanded perlite particle is in the range of about 3 million to 4.5 million BTU's per ton. It is my understanding that with these three furnaces, viz., the rotary furnace, the horizontal stationary furnace, and the vertical furnace, that the products which can be heat treated are zeolite, vermiculite, and perlite, and products of that class. It is not possible to heat treat diatomaceous earth, clay, cement, fly ash, and titanium dioxide, for example, in the vertical furnace or the stationary horizontal furnace or the rotary furnace.

In these furnaces, it may be considered that two types of air are introduced. One type of air is for combustion purposes so that the fuel, such as a hydrocarbon gas, can be burned to give off heat energy. The second type of air can be considered to be an expansion air. The expansion air, along the the particles to be expanded, is heated to be able to carry away the expanded solid particles or the expanded perlite. Because of the necessity of heating the expansion air, a considerable amount of heat energy is used. The expansion air, at ambient temperature, enters into the furnace, is heated and the temperature elevated to that temperature in the furnace, and this heated expansion air used to carry away the expanded solid products and then the heated expansion air is exhausted to the atmosphere. In one manner of thinking, the heating of the expansion air is a waste of heat energy. As a result of my having worked with these furnaces and having worked in the industry for expanding zeolite, vermiculite, perlite, and the like, I have become familiar with the industry and consider that if a furnace could be devised to eliminate the expansion air, then the heat energy required to make the expanded solid particle would be reduced and there would be a saving in energy. Therefore, I have devised a furnace which can be used for expanding zeolite, vermiculite, perlite, and can process diatomaceous earth, clay, cement, fly ash, titaanium dioxide, pumice, and the like, and which furnace uses, essentially, only air for burning the combustible fuel and does not require expansion air for carrying away the expanded solid particles.

THE GENERAL DESCRIPTION OF THE INVENTION

This invention comprises a furnace having two opposed sets of refractories. The refractory may be furnace brick. These refractories are arranged in two circular paths. There is a lower refractory in a circular path and an upper refractory in a circular path with the upper refractory being positioned above the lower refractory. There is a means for rotating one of these refractories. Generally, the lower refractory is rotated. Also, there is means for introducing solid particles onto the lower refractory so the solid particles can be heat treated and, in certain instances, expanded. Also, there is a means to remove the expanded solid particles from the lower refractory and from the furnace.

The refractory can be porous so that a gaseous fuel can pass through the refractory and burn near the surface of the refractory. The furnace requires, essentially, only combustible air for burning the combustible fuel. The furnace does not need expansion air as the expanded solid particle or the heat treated particle is not removed from the furnace by means of expansion air. The expanded solid particle or the heat treated particle is removed from the furnace, mainly, by force of gravity.

In certain instances, it is possible to use a solid fuel, such as coal, or to use a liquid fuel, such as fuel oil and to vaporize the liquid fuel prior to introducing it into the furnace.

With the furnace requiring, essentially, only combustible air for burning the combustible fuel, there is a saving in heat energy and fuel as it is not necessary to heat expansion air and fuel is not wasted in heating the expansion air.

THE OBJECTS AND ADVANTAGES

One of the objects and advantages of this invention is the provision of a furnace which is, relatively, small and compact for the quantity of product produced by the furnace; another important advantage is the provision of a furnace which, for a unit of product, uses less fuel than is used with the present, commercially, available furnaces for heat treating and expanding particles; another object is to provide a furnace which, as compared with commercially available furnaces, has a lower initial cost; an additional object is to provide a furnace which has a high output of product for a unit volume of the furnace; another object is to provide a furnace having refractories which are arranged in a circular pattern for ease of introducing raw material into the furnace and for ease of removal of the heat treated product from the furnace; a further object is to provide for a, relatively, short residence time in the furnace; to provide a furnace requiring a, relatively, small number of accessories; to provide a furnace which is capable of realizing a higher temperature than with a present commercially available furnace; to provide a furnace having opposed heating surfaces so that there is a beneficial effect from radiation; to provide a furnace with two sets of refractories and which refractories are opposed to each other and facing each other; to provide a furnace having a first refractory which is porous and permits fuel to flow through the refractory and burn in close proximity to said refractory; to provide a furnace having a second refractory which is heated by radiation from the fuel burning near said first refractory; to provide a furnace for utilizing incoming air for combustion purposes and to minimize incoming air needed for expansion purposes of expanded solid particles; to provide a furnace wherein the material in the furnace can be elevated from ambient temperature to about 2000° F. in, approximately, 5 minutes; to provide a furnace wherein the refractory rotates in a circle; to provide a furnace wherein the rotational speed of the refractory can be varied for accommodating raw material of different characteristics; to provide a furnace wherein the temperature in the furnace of, approximately, 2600° F. can be realized; to provide a furnace wherein raw material can be fed, continuously, to the furnace and also the product discharged, continuously, from the furnace; to provide a furnace wherein refractory brick of substantially the same characteristics are used; to provide a furnace wherein the ends and sides of the refractory brick are sealed to direct the flow of the gaseous fuel through the main part of the refractory brick; to provide a furnace wherein refractory brick is placed in a side-by-side relation and the space between adjacent refractory brick is sealed; to provide a furnace wherein the exposed surface of the refractory brick is coated with porous aluminum oxide; to provide a furnace wherein raw material can be expanded to make an aggregate for light-weight concrete; to provide a furnace requiring lower capital investment as less pollution controls are required; to provide a furnace which can accommodate various fuels such as a solid fuel, a liquid fuel, and a gaseous fuel; to provide a process where less air is used and less fuel used as compared with the commmercially available processes for heat treating particles and for expanding particles; to provide a process for producing expanded particles of, comparatively, very large size; to produce a stronger expanded product than can be produced with, presently, commercially, available processes in that the expanded product can be annealed; to provide a process for making a shielded encapsulated radioactive material; to expand larger particles to make strong expanded particles which were not, previously, commercially possible as large expanded particles were soft; to expand large particles without suspending the large particles in air; to expand small particles and to collect the expanded particles in a gaseous stream; to expand particles without the necessity of drying the particles to a moisture content of less than about 1% moisture; to expand particles of the moisture content up to about 10% moisture; to provide a process wherein there is a variable residence time to heat treat solid particles and to accommodate solid particles with different characteristics; to process a radioactive material and particles and to encapsulate said radioactive material in a particle to store in a safe manner; to process radoactive salt cake with particles to encapsulate said radioactive salt cake and particles; to process said encapsulated radioactive salt cake so as to retrieve the radioactive material; to process radioactive salt cake with particles to encapsulate the radioactive salt cake and to shield the radioactive material; to process the shielded radioactive salt cake so as to retrieve the radioactive material; to process solid particles to make an expanded solid particle to be used as a light-weight aggregate in concrete; to heat treat solid particles which, prior to my invention, could not be heat treated; to process radioactive material so as to make the material into a form which is not leachable and which form is easier to store; to agglomerate small particles into larger particles so as to achieve a more precise control of bed thickness in a furnace and to realize a faster and more efficient heat transfer to the agglomerated larger particles; to process waste material to make useful products; to agglomerate fines and to process said agglomerated fines to make useful products; and, to heat treat and also to expand particles with various fuels such as a solid fuel, a liquid fuel, and a gaseous fuel.

These and other important objects and advantages of the invention will be more particularly brought forth upon reference to the detailed description of the invention, the appended claims and the accompanying drawings.

THE DRAWINGS

FIG. 1 is a fragmentary, side elevational view of a specific embodiment of the invention and illustrates the distribution system for the fuel and the refractory in the furnace area;

FIG. 2, taken on line 2—2 of FIG. 1, is a fragmentary plan view of the lower refractory in the furnace;

FIG. 3, taken on line 3—3 of FIG. 1, is a fragmentary plan view of the upper refractory in the furnace;

FIG. 4 is a fragmentary plan view illustrating the lower refractory in the furnace, the feeding mechanism for introducing raw material into the furnace, and the discharge mechanism for discharging expanded product from the furnace;

FIG. 5, taken on line 5—5 of FIG. 4, is a frammentary cross-sectional, side elevational view looking into the lower refractory of the furnace;

FIG. 6, taken on line 6—6 of FIG. 4, is a lateral cross-sectional view showing the lower refractory, the support structure for the lower refractory, and the distribution system for the fuel in the furnace;

Figure 9:
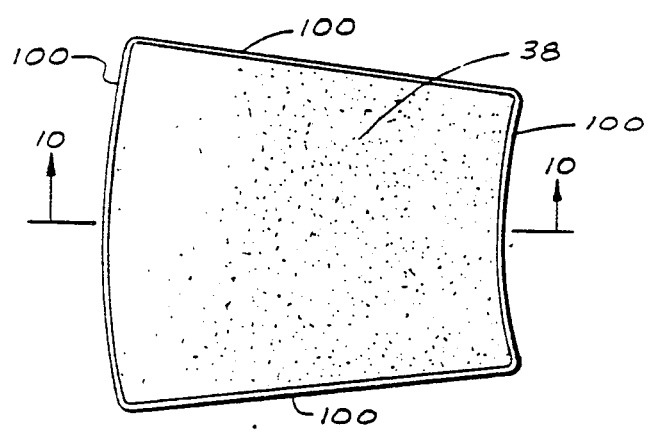
FIG. 9 is a plan view looking at one of the refractory bricks and showing the sealing of the sides and ends of the refractory brick.
Figure 10:
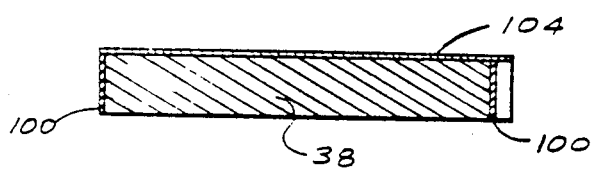
Figure 11:
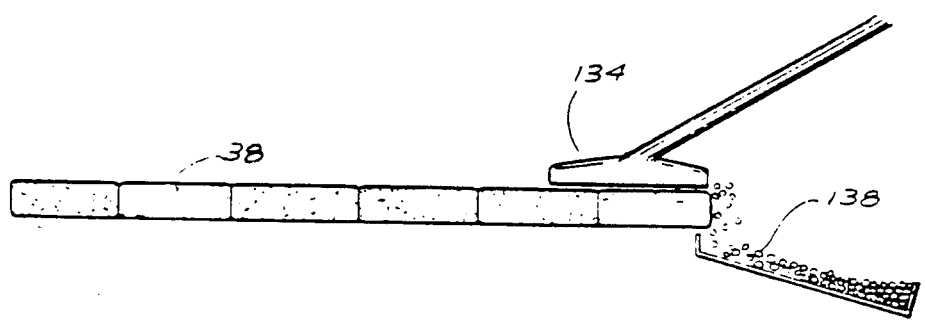
Figure 12:
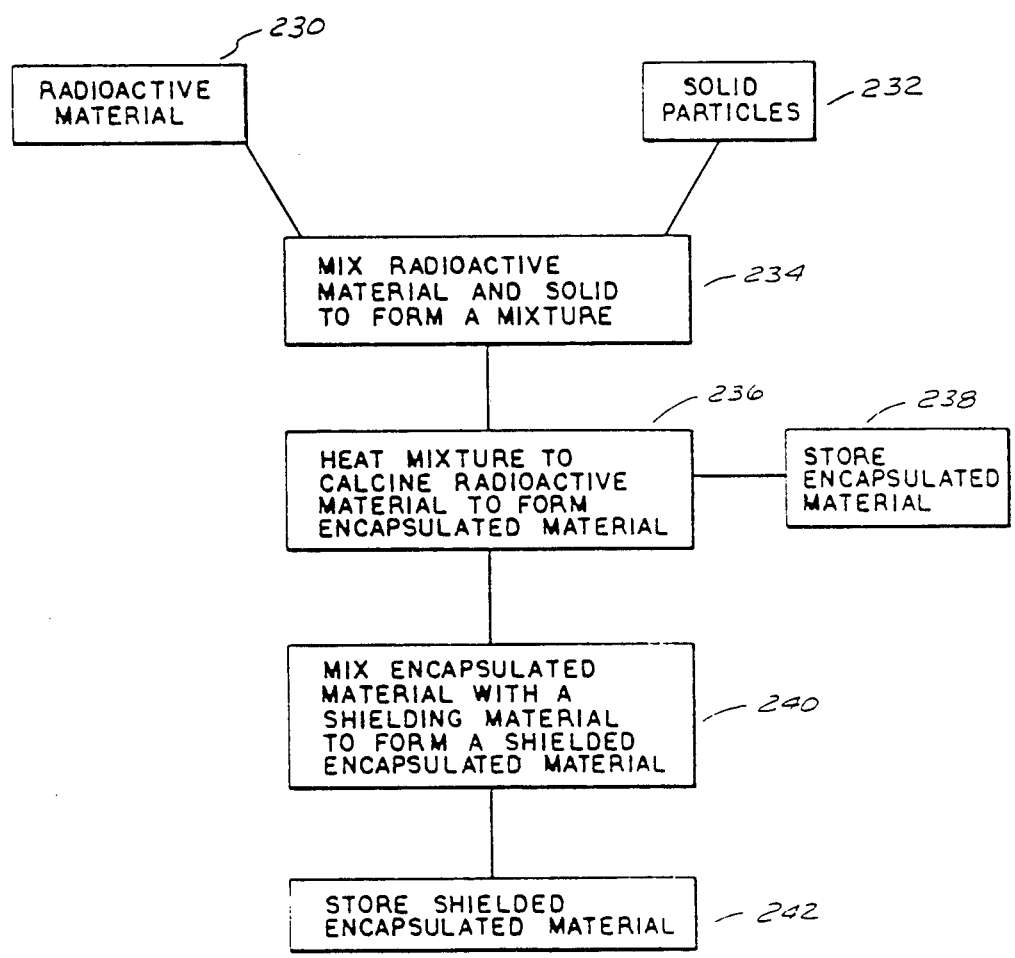
Figure 13:
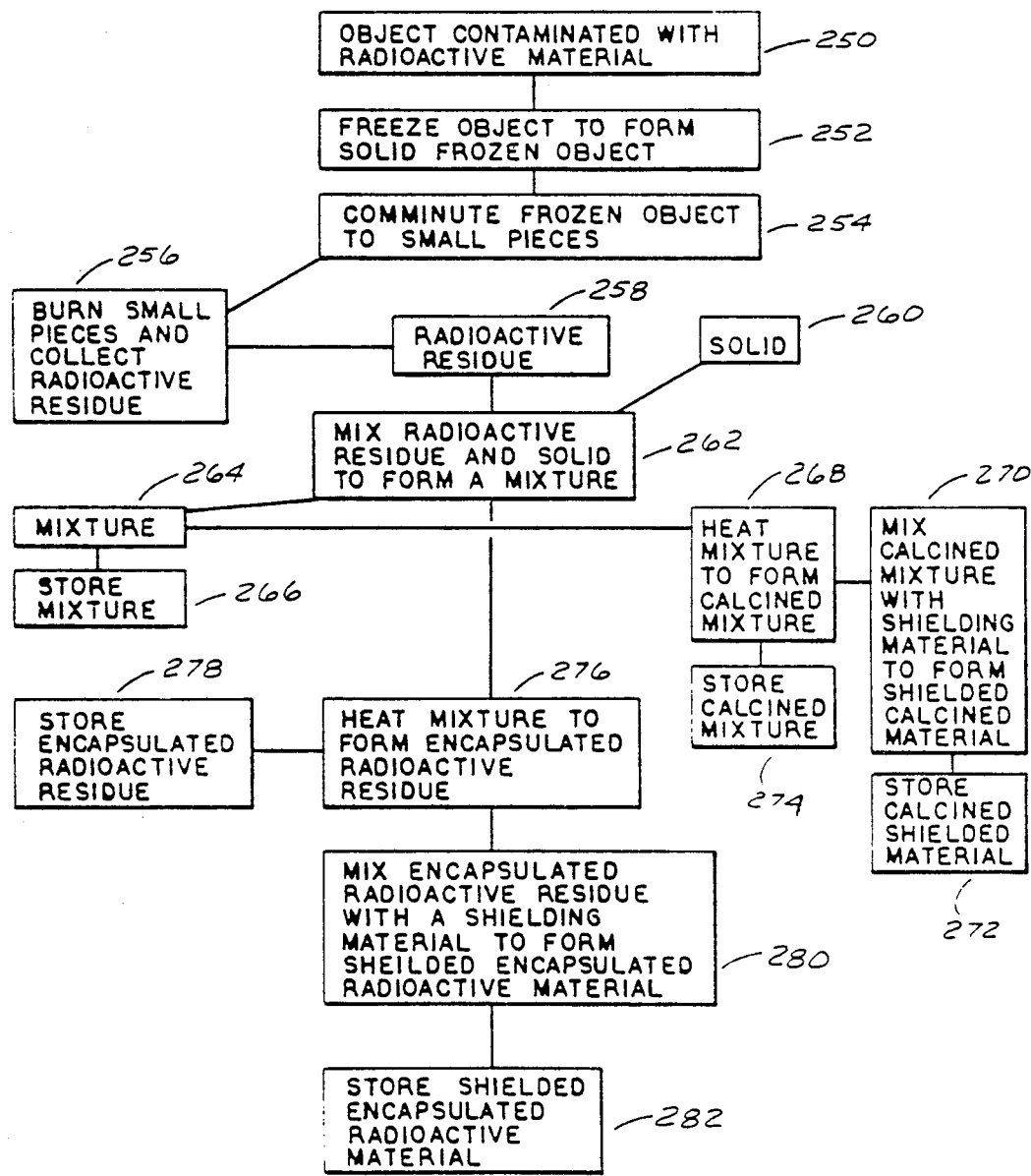
Figure 14:
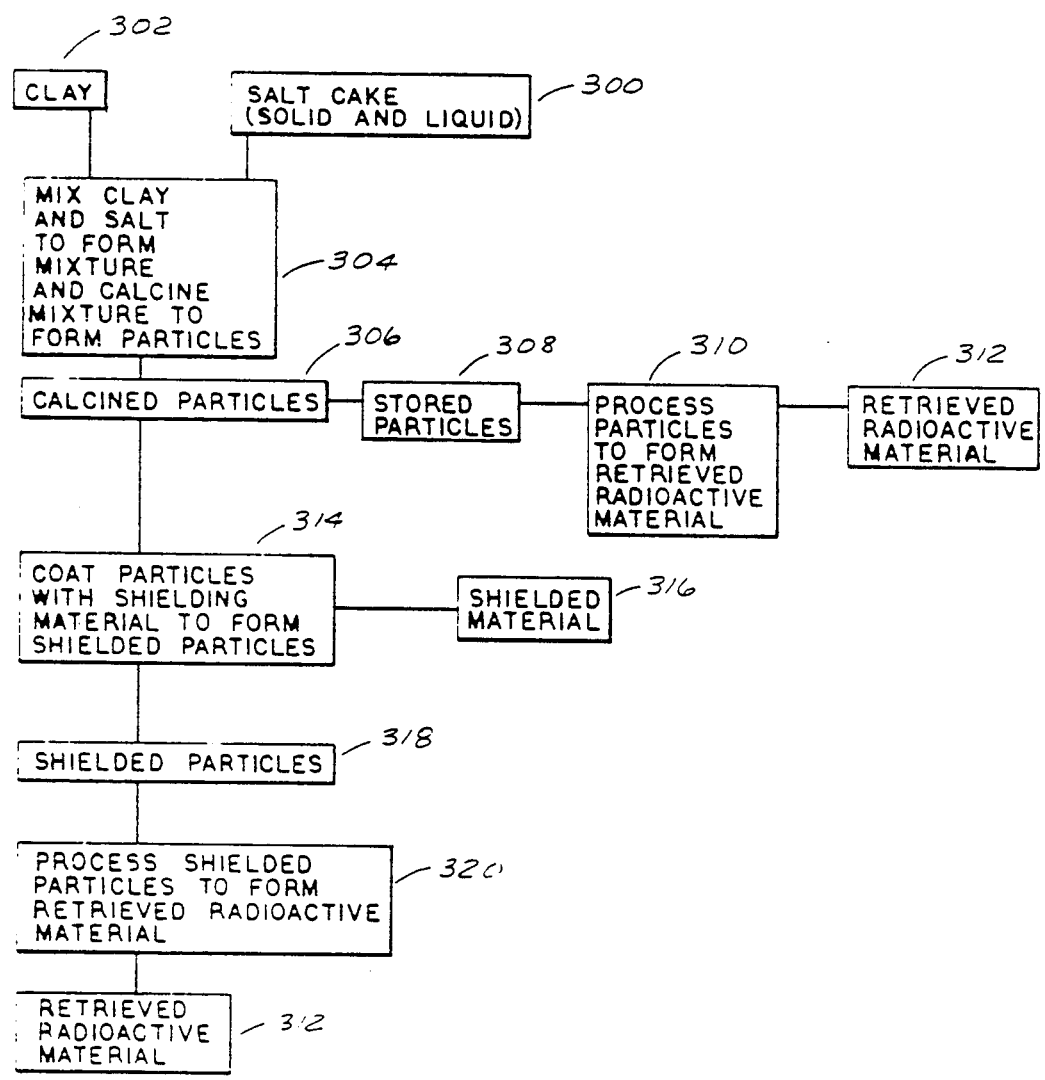
Figure 15:
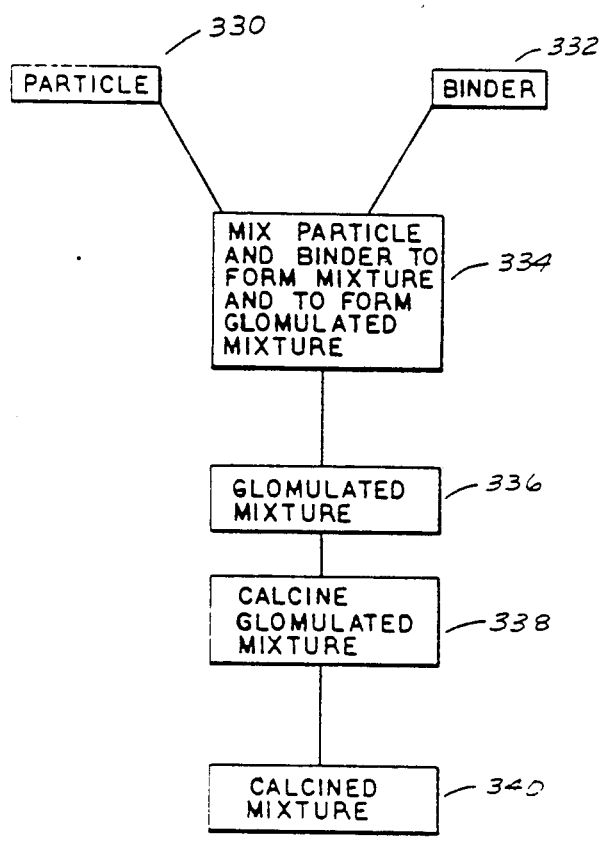
Figure 16:
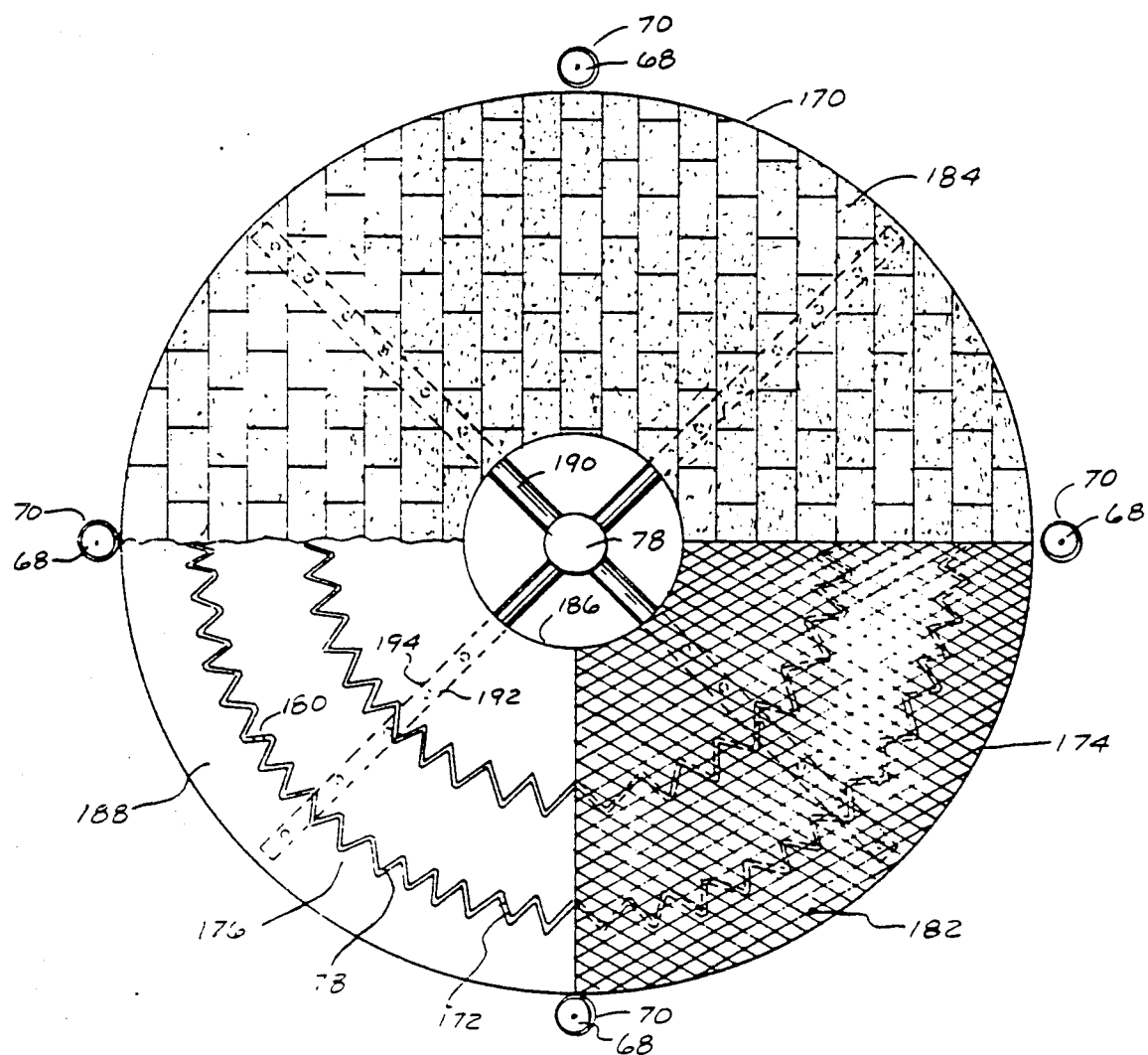
Figure 17:
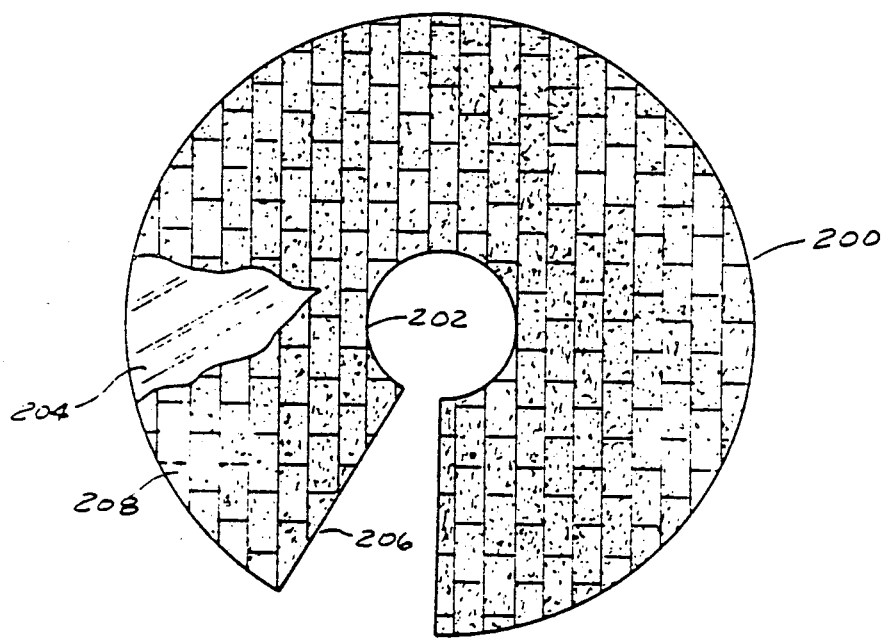
Figure 18:
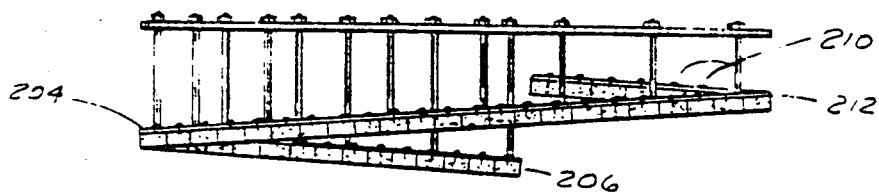

FIG. 10, taken on line 10—10 of FIG. 9, is a vertical cross-sectional view illustrating a refractory brick;

FIG. 11 is a fragmentary elevational view illustrating the doctor blade for removing the expanded solid particles from the furnace;

FIG. 12 is a schematic outline of a process for mixing radioactive material and solid particles to form a mixture and then heating the mixture to encapsulate the radioactive material and then to treat the encapsulated radioactive material with a shielding material;

FIG. 13 is a schematic outline of a process for treating material contaminated with a radioactive material so as to be able to store the contaminated radioactive material;

FIG. 14 is a schematic outline of a process for treating radioactive salt cake with a carrier so as to be able to store the radioactive salt cake, also for being able to retrieve radioactive materials from the salt cake;

FIG. 15 is a schematic outline of a process for treating a particle with a binder so as to be able to agglomerate the particle and binder and then heat treat the particle and binder to form a heat treated product;

FIG. 16 is a fragmentary view looking at the construction of another form of the circular member comprising firebrick and illustrates the supporting structure for the firebrick and the means for distributing fuel to the firebrick;

FIG. 17 is a view illustrating the circular member comprising reflector brick; and, FIG. 18 is a side elevational view of a spiral circular member comprising reflector brick.

THE SPECIFIC DESCRIPTION OF THE INVENTION

One part of this invention comprises a furnace for heating a material to form a heated product and/or an expanded or bloated product. The furnace comprises a first circular member 30 and a second circular member 32.

Figure 2:
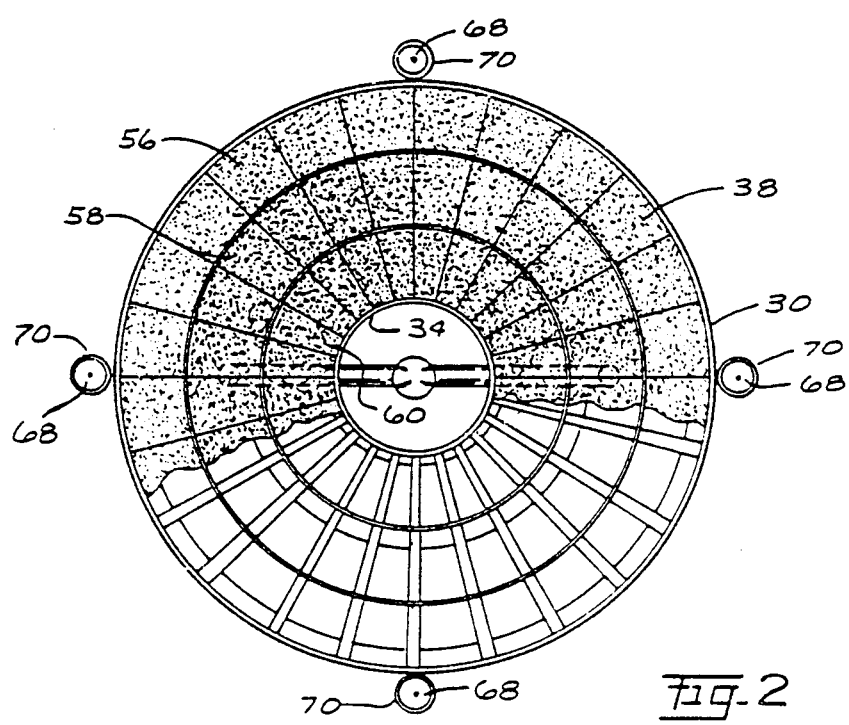

In FIG. 2, it is seen that the first circular member 30 is in the configuration of a torus having a central opening or passageway 34.

Figure 3:
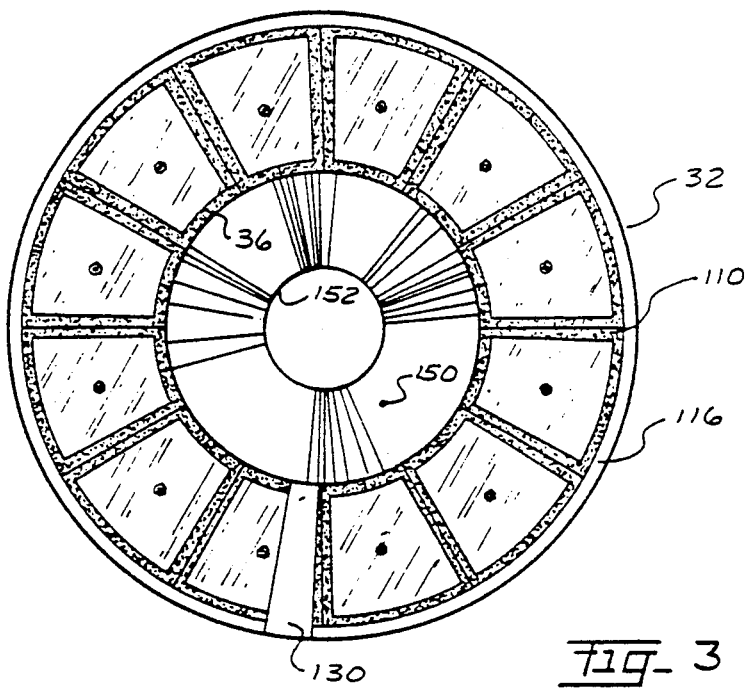

In FIG. 3, it is seen that the second circular member 32 is in the configuration of a torus having a central opening or passageway 36.

Figure 1:
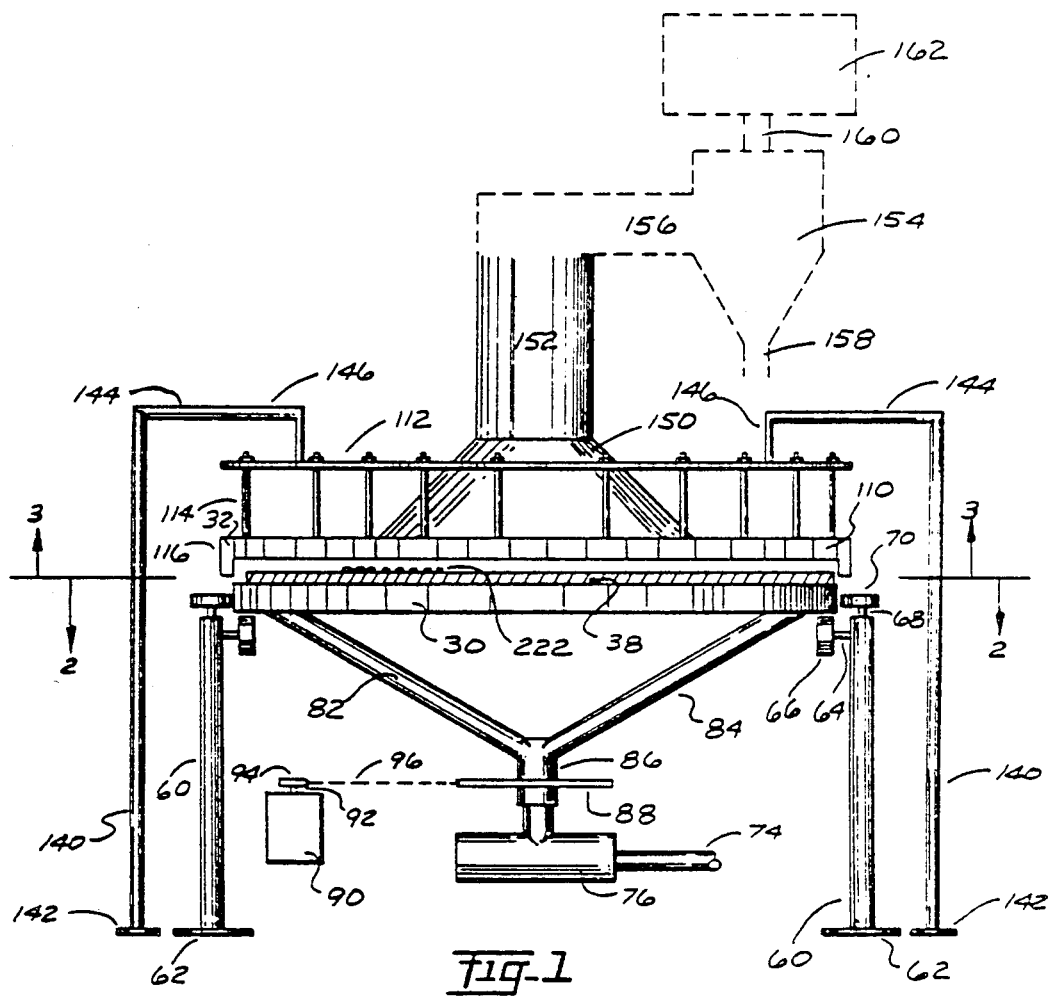

In FIG. 1, it is seen that the first circular member 30 is positioned below the second circular member 32. The first circular member 30 can rotate and the second circular member 32 can be stationary.

The first circular member 30 comprises a plenum chamber and also a support for fire brick 38.

Figure 6:
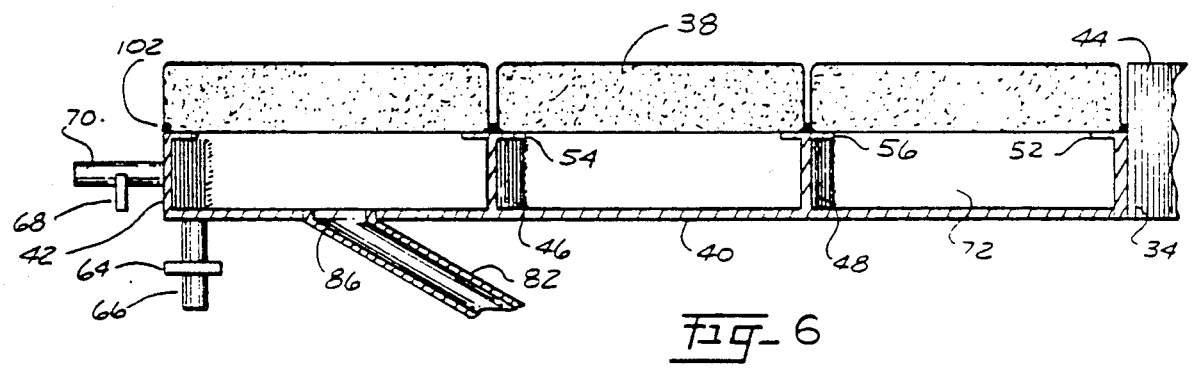

In FIG. 6, there is illustrated the support structure for the fire brick 38 of the first circular member 30. It is seen that there is a bottom support plate 40 in the configuration of a torus. Then, there is an outer circular wall 42. There is also an inner circular wall 44 defining the opening 34. Also, there are two in-between circular wall supports 46 near the wall 42 and 48 near the wall 34. Projecting inwardly on the upper part of the wall 42 is a support ledge 50. And, projecting inwardly of the wall 44 is a support ledge 52. Then, on the upper part of the wall 46 is a support ledge 54 and on the upper part of the wall 48 is a support ledge 56. The firebrick 38 rests on the support ledges. In FIG. 2, it is seen that there are three circular courses of brick. There is an outer circular course of brick 56, a middle course of brick 58, and an inner circular course of brick 60.

In FIG. 2, it is seen that the firebrick 38, is a plan view, are in the figure of the frustum of a trapezoid. The firebrick in the outer course 76 are larger in size than the first brick in the middle course 58. The firebrick in the middle course 58 are of a larger size than the firebrick in the inner course 60. It is to be under stood that a furnace may have only one course of firebrick or may have a large number of courses of firebrick. For illustrative purposes, there is illustrated in the first circular member 30 three courses of firebrick.

There are four upright pedestals 60, spaced at 90° with respect to each other. Each of the pedestals 60 has a supporting foot 62. Also, on the upper end of each of the pedestals 60, there is an inwardly directed shaft 64 and a roller 66 is positioned on the shaft. In FIGS. 1 and 6, it is seen that the bottom support plate 40 rests on the rollers 66 and that the first circular chamber 30 can rotate on these rollers 66. Further, on the upper part of the upright pedestals 60, there is an upwardly directed shaft 68. There is positioned on the upwardly directed shaft 68 a roller 70. in FIGS. 1, 2, and 6, it is seen that the outer circular wall 42 is positioned between the four rollers 70. The first circular member 30 can rotate between the rollers 70 and can be positioned by these rollers 70.

In FIGS. 1, 2, and 6, there is illustrated a feed system for feeding an air-combustible gas mixture, such as propane or butane, to the plenum chamber of the first circular member 30. In FIG. 6, the plenum chamber is identified by reference numeral 72.

There is an inlet pipe 74 connecting with a mixing chamber 76. The mixing chamber 76 has an outlet nozzle 78.

There is an adapter 80 which fits over the outler nozzle 78. The adapter connects with two arms 82 and 84. In FIG. 6, it is seen that the arm 82 connects with an opening 86 in the bottom support plate 40. Likewise, the arm 84 connects with another opening in the bottom support plate 40. The arms 82 and 84 are welded to the bottom support plate 40.

There is attached to the adapter 80 a sprocket 88. Also, positioned near the mixing chamber 76 is a motor and variable drive gear box 90 having outlet shaft 92. On the outlet shaft 92, is a sprocket 94. A chain 96 connects the sprocket 88 and the sprocket 94. With the actuation of the motor and variable drive gear box 90, the sprocket 94, the chain 96, and the sprocket 88 move so as to rotate the adapter 80 and the arms 82 and 84 and the first circular member 90.

With the rotation of the sprocket 88 and, correspondingly, the first circular member 30, the material placed on the firebrick also rotates.

The firebrick 38 is a porous brick and allows the mixture of air an combustible gas to pass from the plenum chamber and through the interstices of the brick to the surface of the brick. From experience, I have found that the ends and sides of the firebrick 38 should be painted with a "temperature resistant" paint or a fireproof paint 100. This paint is impervious to the flow of the air-combustible gas mixture and thereby restricts the flow of the air-combustible gas mixture to passing through the brick. In placing the brick 38 on the support ledges, there is used a silicone sealant 102 to seal between the surface of the brick and the surface of the ledge.

The firebrick may be one of many suitable bricks, such as K30 B and W. There may be placed on top of the firebrick, a layer 104 of aluminum oxide or silicone carbide. The porosity of the layer 104 of aluminum oxide or silicone carbide is of the same porosity as of the firebrick 38. The layer 104 is harder than the firebrick 38 so as to resist abrasion. Further, I consider that it is desirable that the firebrick 38 be as uniform as possible with respect to dimension and with respect to weight. It is possible within a narrow tolerance range to have the firebrick 38 in a course of the same general dimensions with respect to length, width, and thickness and also the same general pososity. Naturally, the firebrick 38 will vary in dimensions from one course to another course but in the same course, the firebrick should be of the same general characteristics.

The second circular member 32 comprises a number of refractory brick 110 positioned above the firebrick 38 of the first circular member 30. In FIG. 1, it is seen that there is an upper circular ring 112. The refractory brick 110 are suspended from the ring 112 by means of bolts 114. In FIG. 1, it is seen that the spacing between the refractory brick 110 and the firebrick 38 remains constant.

In FIG. 1, it is seen that on the outside of the refractory brick 110 and the second circular member 32 that there is a depending circular rim 116. The depending circular rim 116 assists in maintaining the material being processed between the firebrick 38 and the refractory brick 110.

Figure 7:
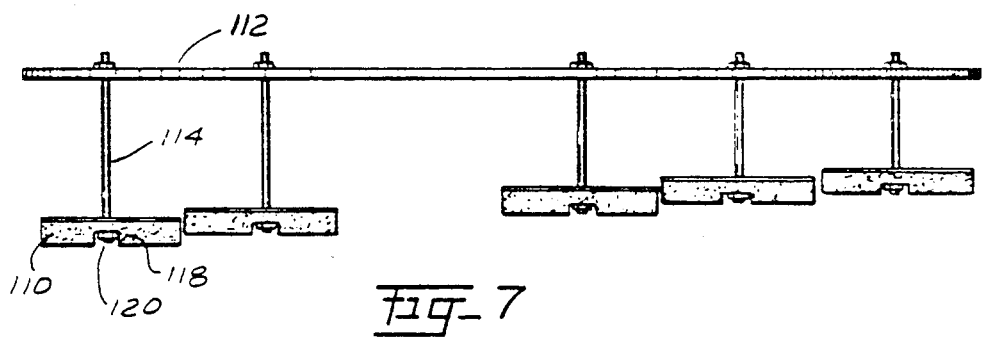
FIG. 7 is a fragmentary elevational view illustrating one manner for positioning upper refractory on a ring in the furnace.

In FIG. 7, there is illustrated the upper circular ring 112 and bolts 114 connecting with the refractory brick 110. In FIG. 7, it is seen that the length of the bolts 114 vary so as to have some of the refractory brick 110 farther away from the ring 114 than other refractory brick. The result is that some of the refractory brick 110 are closer to the firebrick 38. The reason for this is that when the material to be processed is initially placed on the firebrick 38, it is of a, relatively, small volume. After a while, this material expands into a larger volume and in order to accommodate the larger volume, the refractory brick 110 must be positioned farther away from the firebrick 38. In FIG. 7, it is seen that the refractory brick 110 have a recess 118. There is a nut 120 screwed onto the threaded end of the bolt 114 and in said recess 118.

Figure 8:
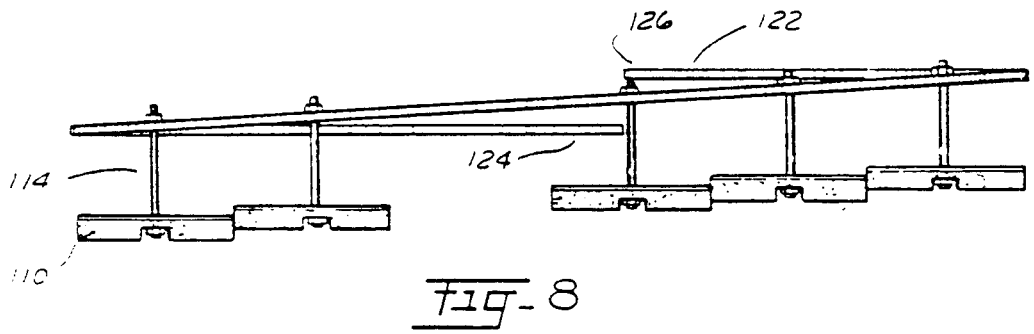
FIG. 8 is a fragmentary elevational view illustrating another manner for positioning the upper refractory on a spiral ring in the furnace.

In FIG. 8, there is illustrated a split upper ring 122. The split upper ring is in the form of a spiral having a lower end 124 and a upper end 126. A number of bolts 114 connect with the ring 122 and also connect with and support the refractory brick 110. In FIG. 8, the bolts 114 can be of, substantially, the same length even though some of the refractory brick 110 are positioned closer to the firebrick 38 than some of the other refractory brick 110. Again, the spacing of the refractory brick 110 with respect to the firebrick 38 is to accommodate the various size and volume of the material being processed.

Figure 4:
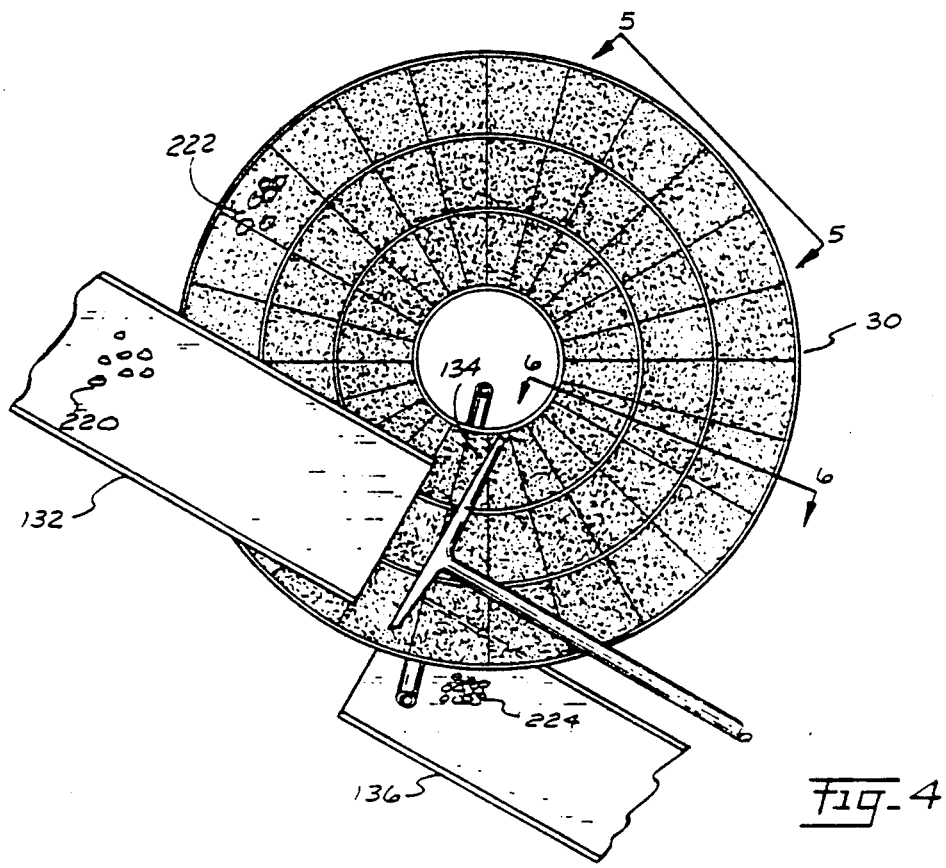
Figure 5:
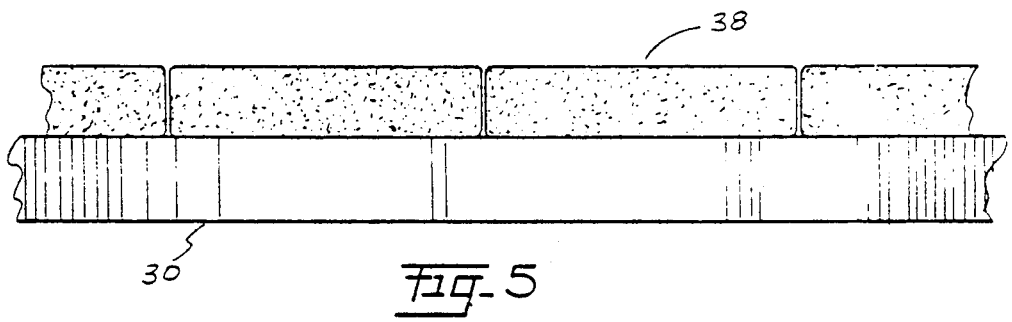

In FIG. 3, it is seen that there is a void 130 between two adjacent refractory brick 110 so as to allow material to be introduced between the second circular member 32 and the first circular member 30. This is more clearly illustrated in FIG. 4 wherein it is seen that there is a chute 132 or conveyor 132 for introducing product onto the firebrick 38. It is to be remembered that the lower circular member 30 and the firebrick 38 rotate while the upper circular member 32 and the refractory brick 110 as stationary or do not rotate. With the opening of void 130 in the upper circular member 32, the material to be processed can be introduced by means of the chute 132 so as to fall onto the firebrick 38. In FIG. 4, it is seen that the lower circular member 30 rotates in a clockwise direction. Also, in FIG. 4, it is seen that there is a doctor blade 134. The doctor blade extends to the outer edge or periphery of the lower circular member 30 so as to cause the processed material to flow toward the periphery of the member 30. There is positioned, partially, under the member 30 a sloping conveyor or chute 136. The material which has been processed is forced by the doctor blade to fall onto the chute 136 and be removed from between the firebrick 38 and the refractory brick 110.

In FIG. 7, it is seen that there is an opening 130 between the adjacent refractory brick 110 attached to the circular ring 112. Likewise, in FIG. 8, it is seen that there is an opening 130 between firebrick 110 attached to the split circular ring 122. The openings 130 illustrated in FIGS. 7 and 8 make it possible to introduce the material to be processed onto the firebrick 38 of the lower circular member 30.

In FIG. 11, there is illustrated the doctor blade 134 positioned above the firebrick 38 and positioned so as to drop the product 138 onto the sloping conveyor 136.

In FIGS. 1 and 2, it is seen that there are spaced apart pedestals 140, on the outside of the upright pedestal 60. On the lower part of the pedestal 140, there is a foot 142. On the upper part of the pedestals 140, there is a flange or arm 144. There depends from the flange or arm 144 a support 146, such as a bolt or a rod. The bolt or rod 146 also connects with the upper circular 112 or the split ring 122 so as to support the ring and the refractory brick 110 above the firebrick 38.

In FIGS. 1 and 3, there is illustrated an exhaust system for the products of combustion and, possibly, some of the resulting product from the process. In FIGS. 1 and 3, it is seen that there is a hood 150 positioned above the opening 36 in the upper circular member 32. The hood 150 connects with the exhaust pipe 152. It is possible to exhaust the gases from the furnace 28 through the exhaust pipe 152 and into the atmosphere. Sometimes, it may be desirable to separate entrained solids in the exhaust gases. Therefore, there is illustrated in FIG. 1, in broken line or phantom line, a cyclone 154 which connects with the exhaust pipe 152 by means of an inlet pipe 156. The cyclone 154 has a lower exhaust pipe 158. On the upper end of the cyclone 154, there is a motor-van-passageway 160 for directing the exhaust gases from the cyclone 154 and into a bag house 162. It is seen that some of the solid particles in the exhaust gases are separated in the cyclone 154 and flow out of the cyclone through the exhaust 158. Also, the gases which flow from the cyclone 154 into the bag house 162 can flow out of the bag house. The bag house will remove the small particulate solids in the exhaust gases.

In FIG. 16, there is illustrated another species of a lower circular member 170. It is seen that this species comprises a bottom support plate 172 surrounded by an upwardly directed circumscribing rim 174. Further, it is seen that positioned on the lower support plate 172 are a number of flat bars 176 having bends 178. These flat bars can be positioned on edge on the plate 172. In the zigzag flat bars 178, there may be passageways 180.

There is positioned on top of the zigzag bars 178, expanded metal 182. Then, there is positioned on top of the expanded metal 182, firebrick 184. The firebrick 184 may have the sides and ends painted with a high temperature fire resistant paint so as to seal the firebrick. Further, the tops of the firebrick 184 may be coated with a block of aluminum oxide or silicone carbide of substantially the same porosity as the firebrick 184. The reader is to understand that the firebrick 184 and porous and that the mixture of air and combustible gas can pass through the porous firebrick 184 and also the coating of aluminum oxide or silicone carbide so as to be able to burn on top of the firebrick 184. It is to be understood that part of the lower circular member 170 between the lower plate 172, the outer circumscribing rim 174, the inner circumscribing rim 186, and the lower part of the firebrick 184 is a plenum chamber 188. There can be introduced into the plenum chamber 188, the air and combustible gas mixture. To introduce the air and combustible gas mixture into the plenum chamber 188, there are four arms 190 connecting with the outlet nozzle 78 of the mixing chamber 76. The four arms 190 may be square tubes. In the lower plate 172, there are a number of openings 192. Aligned with the openings 192 in the plate 172 are openings 194 in the tubes 190. The tubes 190 can be welded to the lower plate 172 so as to form a rigid structure with the openings 192 and the openings 194 aligned for introducing the air-combustible gas mixture into the plenum chamber 188. Again, it is to be realized that the lower circular member 170 rotates as does the lower circular member 30 as, previously, explained in a foregoing part of this written description.

One of the advantages of the lower circular member 170 is the firebrick 184 need not be cut into a trapezoidal configuration. There is a saving in time and money by using standard fire brick 184. The firebrick 184 are supported on the expanded metal 182 which, in turn, is supported on the lower support plate 172. The lower support plate 172 is supported by the rollers 66, see FIG. 1, and the description of the rollers 66. Further, the lower circular member 170 is prevented from a sideways motion by the rollers 70 positioned on the upright pedestal 60.

In FIGS. 17 and 18, there is illustrated an upper circular member 200 having a central opening 202. The upper central member 200 comprises sheet metal 204 in the configuration of a spiral, see FIG. 18. Sheet metal 204 is not continuous as there is a break to form an opening 206.

There is attached to the sheet metal 206 refractory brick 208. The refractory brick 208 can be attached by means of sheet metal screws 210 and an adhesive 212. Also, there is on the periphery of the sheet metal 204, and depending therefrom, a circumscribing depending rim 214. This rim 214 assists in maintaining the product in the furnace 28 between the rotating lower circular member and the upper stationary circular member.

Again, the opening 206 is to allow material to be introduced onto the rotating lower member.

An advantage of the upper circular member 200 is that it is not necessary to cut the refractory brick into the configuration of a frustum of a cone, see refractory brick 110 in FIG. 3. The refractory brick 208, in the main, can be standard, commercially, available brick. The use of this standard brick results in a less expensive upper circular member 200. Also, the sheet metal 204 can be shaped into the form of the split circular spiral.

The material 220 to be processed can be positioned on the chute or conveyor 132 and then placed on the firebrick of the first circular member, see FIG. 4. In FIG. 4, it is seen that this first circular member rotates in a clockwise direction and that the material is processed into semiprocessed material 222. After the material has been further processed into a product 224, the material can be removed from the lower circular member by means of doctor blade 134. The product 224 will fall onto the chute 136 for further treatment, such as packaging, or for use, such as in light weight concrete, gardens, insulation, filter aid, and the like.

Some of the material which can be processed in this furnace 28 are perlite, vermiculite, volcanic ash, pumice, zeolite, clay, diatomaceous earth, carriers for radioactive materials, titanium dioxide, salt cake, and the like.

The furnace 28 can achieve a temperature in the range of about 2500° to 2600° F. This is a sufficiently high temperature to process these materials.

It is possible to introduce the material 220, viz., perlite, vermiculite, volcanic ash, pumice, and zeolite into the furnace 28. This material 220 on the firebrick will be heated and expand. For example, the density of the perlite 220 being introduced into the furnace 28 may be in the range of about 80 pounds per cubic foot while the density of the processed perlite 224 or expanded perlite 224 may be in the range of 5 pounds to 10 pounds per cubic foot. For example, the expanded perlite may have a density in the range of 3 pounds to 4 pounds per cubic foot and may range in particle size from +50 mesh to −100 mesh. Perlite in the range of 15 to 20 pounds per cubic foot may have a particle size of about ⅜ of an inch. I have found that it is not necessary to use a flux with perlite. The perlite can be expanded without the use of a flux, such as sodium carbonate, potassium carbonate, sodium oxide or potassium oxide. With the operation of the furnace 28, I have noticed that the perlite is, apparently, annealed and is stronger or tougher than expanded perlite made in a rotary furnace or a verticle furnace. The use of the expanded perlite can be for purposes of insulation, a filter aid for food products, an aggregate in light weight concrete, and a soil conditioner for horticultural purposes.

Vermiculite can be treated in a manner similar to the treatment of perlite. Vermiculite is a schist and comprises a mixture of vermiculite and hornblend. The vermiculite ore can be passed through a rotary dryer and then screened to a size in the range of ⅜ inches to +40 mesh to form the material 220 to be expanded. The vermiculite 220 is introduced into the rotary furnace 222 and processed to form the processed vermiculite 224. The processed vermiculite 224 is softer than the processed perlite 124. However, the processed vermiculite can be used for purposes of insulation and as an aggregate in the formation of insulation board. It is possible to saw the insulation board, nail the insulation board, and use the insulation board in building a structure, such as a house or a shop.

In addition to expanding or bloating materials, such as perlite and vermiculite, in the furnace 28, this furnace can also be used for calcining materials. For example, materials 220 which can be calcined are diatomaceous earth, clay, cement, titanium dioxide, fly ash, volcanic ash, natural zeolites, and pumice, to name a few. Many of these materials are of such a small size, even approaching the size of powder, it is not reasonable to process these materials in the furnace 28. In order to process there materials, it is necessary to add a binder to make the material somewhat sticky to form a sticky material. Then the sticky material is placed on a screen or a similar device and agitated to cause the sticky material to ball up or to agglomerated so as to form a agglomerated material. In this process of forming the glomulated material, the particle size can be, readily, controlled. The transformation of the powder material to a larger and specific particle size by the agglomeration process allows precise control of the bed thickness of the material 220 on the fire brick of the furnace 28.

To make the agglomulated product, there is employed a binder. The binder can be one of many chemicals or a combination of chemicals varying from plain water to complex chemicals depending upon the requirements of the material being treated. For example, in the calcining of diatomaceous earth for filter aid products, there is added to the diatomaceous earth a sodium flux, such as sodium carbonate. However, other sodium compounds can work as well as sodium carbonate, such as sodium hydroxide, sodium chloride, sodium silicate, and corresponding potassium compounds. One of the fluxes can be in liquid form such as sodium carbonate diluted with water. In the case of the calcining of clay, the addition of water as a binder and then the balling up or agglomeration of the clay can be achieved. The agglomerated clay particles will hold together long enough to satisfy the bed thickness requirement in the furnace 28. In certain instances, where higher heat requirements might be needed, they can be achieved with the use of air and a natural gas combustion mixture; the binder can be a fuel, either liquid or solid. For example, in the processing of cement, there may be mixed coal and cement and an oxidizing agent to form the agglomerated product. The coal is burned in the furnace 28 and the ash from the coal can become integrally mixed with the cement. If the ash from the coal is detrimental to the product 224 from the furnace 28, then liquid petroleum can be used as the binding agent in the agglomeration process. The oxidizing agent may be a potassium chlorate.

In the calcining of these materials, the step of forming agglomerated products is important. By being able to have the agglomerated products within a certain range of sizes or within a certain size range, it is possible to control the thickness of the material 220 on the firebrick. This makes possible a more precise control of heat transfer to the material 220. The heat transfer to the material 220 can be quicker and easier for a controlled bed thickness as contrasted with a bed thickness which is not controlled. Also, a more uniform processed product 224 can be realized with a controlled bed thickness of the material 220.

The finely divided material and the powder which have been processed to make a agglomerated product 220 can be further processed in the furnace 28 to calcine the agglomerated product. In calcining the agglomerated product 220, the product is heated to a high temperature without fusing the product 220 to make the processed product 224. In the calcining operation, the glomulated product 220 undergoes changes, such as oxidation, and also changes, such as forming a smooth or glasslike surface on the processed product 224.

An example will assist in explaining the agglomerating process and also the calcining process. A suitable subject is diatomaceous earth which is a nonmetallic mineral composed of about 80% to 90% amorphous silica. The silica is the skeletal remains of diatoms in the ocean, millions of years ago. The crude diatomaceous earth is mined by open pit methods and transported to a plant site. The mined, crude diatomaceous earth is crushed, dried, and then pulverized and foreign material separated. At this stage of the process, the crushed diatomaceous earth will pass 90% through a 325 mesh screen (44 microns). The crushed diatomaceous earth is mixed with a flux. The flux can be sodium carbonate or sodium silicate, or sodium oxide, or potassium carbonate or potassium oxide, or potassium silicate. It is advantageous to mix the flux with water to form a liquid flux. The liquid flux is mixed with the crushed diatomaceous earth and formed into the agglomerated product 220. Then, the agglomerated diatomaceous earth 220 can be introduced into the furnace 28 and heated to form the processed diatomaceous earth product 224 which has a glaze or a glassy surface on the individual agglomerated particles. In the furnace 28, the sodium in soda ash reacts with the silica of the diatomaceous earth at a temperature of about 1850° F., to form the product 224.

Similarly, fine particles of clay can be mixed with water and processed to form agglomerated clay. The glomulated clay 220 can be introduced into the furnace 28 and heated and processed to form glomulated clay products 224, which have a smooth or glassylike surface.

Similarly, fine particles of titanium dioxide, fly ash, volcanic ash, cement, natural zeolite, pumice, and the like can be mixed with a flux, such as a sodium salt like sodium carbonate or sodium silicate or a potassium salt like potassium carbonate or potassium silicate and formed into agglomerated products 220 which can be introduced into the furnace 28 to form a processed product 224 having a smooth or glassy surface.

The calcined clay has a higher brightness and opacity than natural clay and therefore is valuable in the manufacture of high-gloss paper. The calcined clay has better hiding power in the high-gloss paper.

A calcined diatomaceous earth, calcined in the temperature range of about 1750°-1900° F. can be used as a filter aid, used as a filler in paint and also used as a filler in paper.

In regard to diatomaceous earth which is used as a filter aid, the calcining process can be valuable in rejuvinating the filter aid. For example, the filter aid comprising spent diatomaceous earth can be processed and mixed with a binder, such as sodium silicate to form a agglomerated product 220 in the form of a discrete unit or a ball. Then, this discrete unit or ball 200 can be introduced into the furnace 28 and heated to a temperature in the range of about 1750°-1900° F. to form a new filter aid comprising the glazed or glassy diatomaceous earth ball or discrete unit. A result of this is the reusing of diatomaceous earth and the elimination of the step of throwing away used diatomaceous earth which has served a purpose as a filter aid.

In addition to being able to calcine volcanic ash and pumice, it is also possible to expand the volcanic ash and pumice in the furnace 28 in the same manner that perlite and vermiculite are expanded, as above disclosed. Further, zeolite can be expanded in the furnace 28 and also can be calcined in the furnace 28.

In FIG. 12, there is illustrated a process for treating radioactive material so that the radioactive material can be stored.

Radioactive material 230 and solid particles 232, such as diatomaceous earth, clay, cement, fly ash, volcanic ash, natural zeolites, and pumice, are mixed together at step 234 to form a mixture of glomulated product.

Then, at step 236, the agglomerated product or mixture is calcined to form a solid encapsulated material. The encapsulated material comprises the radioactive material and the solid particles. The encapsulated material can be stored at step 238. Or, the encapsulated material can be mixed with a shielding material, such as lead or boraxo or polyethylene at step 240 to form a shielded encapsulated material comprising the radioactive material. In this manner, there are prepared small, discrete, solid particles comprising radioactive material and which small, solid, discrete particles can be coated with a shielding material to lessen the radiation from the small, discrete particles. The shielded encapsulated material can be stored at 242.

The process of FIG. 12 makes it possible to transform the radioactive material, usually in a liquid form, into a solid and then to coat the solid with radioactive shielding material so as to make it possible to more, safely, store the radioactive material.

In FIG. 13, there is illustrated a process for treating objects 250 contaminated with radioactive material. For example, objects 250 which are contaminated with radioactive material are paper, clothing, gloves, rubber, plastic and the like which are used in the area of radioactive material. In this process, the objects 250 can be frozen at step 252 to form a solid frozen object. The objects 250 may be frozen by being contacted with liquid nitrogen so as to form a brittle, solid, frozen object.

Then, in step 254, the brittle, solid, frozen object can be comminuted to small pieces. The brittle, solid, frozen objects may be comminuted in a ball mill or hammer mill or appropriate apparatus. The solid, frozen objects are processed at step 256 by burning so as to leave a radioactive residue which can be collected. The radioactive residue may be trapped in stack gases by a filter. It is to be remembered that radioactive particles are discrete particles and are not gases. The radioactive particles are solid and therefore can be trapped by a filtering means. Further, the step 256 reduces the volume of the objects containing the radioactive material. Prior to steps 252, 254, and 256, the volume of the objects containing the radioactive material was quite large. With these steps, the volume of the radioactive material is reduced to a more manageable volume.

The radioactive residue 258 is mixed with a solid 260. The solid 260 may be a chemical which can be calcined, for example, diatomaceous earth, clay, cement, titanium dioxide, fly ash, volcanic ash, natural zeolites, pumice, and the like. At step 262, the radioactive residue and the solid 260 are mixed to form a mixture 264. The mixture 264 may be stored at 266.

The mixture 264 may be calcined in the furnace 28, see step 268, to form a calcined mixture. The calcined mixture has a smooth or glossy appearance and is a solid. The calcined mixture in step 270 can be mixed with a shielding material, such as lead, boraxo, polyethylene and the like to form a shielded calcined material. At step 272, the shielded calcined material can be stored. The shielded calcined material is a solid and the radioactive waste is stored as a solid. The shielding of the radioactive waste lessens the radiation escaping into the surrounding atmosphere from the radioactive waste.

The calcined mixture from step 268 can be stored at 274.

If the solid 260 be perlite or vermiculite or volcanic ash or pumice, then the mixture 264 can be processed in the furnace 28 at step 276 to form an encapsulated, radioactive residue. The radioactive residue can be stored at step 278. The encapsulated, radioactive residue is a solid and can be easily handled in the solid form. At step 280, the encapsulated, radioactive residue can be mixed with a shielding material, such as lead, borax, or polyethylene to form a shielded, encapsulated, radioactive material. The shielded, encapsulated, radioactive material can be stored at step 282. In FIG. 13, it is seen that there has been provided a process for treating an object contaminated with the radioactive material and then to store the resulting radioactive residue either in a calcined form or in an encapsulated form. In both the calcined form and the encapsulated form, the radioactive residue is a solid and can be, readily, handled.

In FIG. 14, there is illustrated a process for processing salt cake 300. Salt cake comprises radioactive material and may be a solid, a liquid, and a mixture of solids and liquids. In the processing step, salt cake 300 is mixed with clay 302 to form agglomerated particles. These agglomerated particles can be classified as to size and introduced into the furnace 28. In the furnace 28, the agglomerated particles of clay and salt cake can be heated to form calcined particles 306. These calcined particles 306 are a solid and have a glassy or glossy appearance. It is to be remembered that these calcined particles 306 are discrete units of, substantially, the same size as the agglomerated particles formed by mixing the clay and salt cake. At step 308, the calcined particles can be stored. At a desirable time, the calcined particles 306 can be taken from storage 308 and processed in step 310 to form retrieved radioactive material 312. The retrieved radioactive material 312 may be used in a suitable and desirable manner.

Instead of storing the calcined particles 306, it may be desirable in step 314 to coat these calcined particles with a shielding material 316. The shielding material may be lead, borax, polyethylene, to name a few suitable shielding materials. The coating of the calcined particles of the shielding material results in shielded particles 318. The shielded particles 318 are safer to store than the calcined particles 306 and are, therefore, more easily stored than the calcined particles 306. At a suitably desirable time, the shielded particles 318 can be processed at step 320 to form retrieved radioactive material 312.

In FIG. 15, there is illustrated the process of mixing a particle 330 with a binder 332. As previously stated, the particle may be diatomaceous earth, clay, cement, titanium dioxide, fly ash, volcanic ash, natural zeolites, pumice, to name a few. The binder may be water, sodium carbonate, sodium silicate, sodium oxide, potassium oxide, potassium carbonate, potassium silicate, to name a few suitable binders. At step 334, the particle 330 and the binder 332 may be mixed to form a mixture and then the mixture agglomerated to a suitable particle size to form a glomulated mixture 336.

The agglomerated mixture 336 may be introduced into the furnace 28 and the agglomerated mixture calcined at step 338. As previously explained, in the calcining of the agglomerated mixture, there is formed glossy or glassy or smooth particles identified as a calcined mixture 340. The calcined mixture 340, has previously been referred to as the processed product 224 and the agglomerated mixture has previously been referred to as the agglomerated product 220.

In FIG. 4, the doctor blade 134 need not touch the firebrick of the lower circular member 30 but, instead, can be an air doctor blade for blowing or moving the product 224 across the firebrick and toward the sloping conveyor 136 for removal from the vicinity of the furnace 28.

One of the advantages of the furnace 28, as compared with a rotary furnace or a vertical furnace or a horizontal stationary furnace is that less air is required in the furnace 28 than with any of the other furnaces. For example, with the furnace 28, the air required in the air of combustion to burn the fuel. There is no need to heat extraneous air for removing the expanded product, such as bloated perlite or bloated vermiculite or bloated volcanic ash or bloated pumice from the furnace. In the other furnaces, air is needed for both combustion and the removal of the bloated product from the furnace. With the furnace 28, it is possible to heat the furnace to a temperature of about 2000° F. in approximately 5 minutes.

With the furnace 28, as compared to the above enumerated furnaces, it is not necessary to predry the material to be processed to a moisture content of less than 1%. It is possible to use perlite having a moisture content in the range of 3% to 10%. With the above enumerated furnaces, such as a vertical furnace or a horizontal furnace or a rotary furnace, it is necessary to dry the material to be processed to a moisture content less than one percent. In these furnaces, the residence time is approximately one second. In the furnace 28, the residence time can be varied to suit the material to be processed and the residence time can be varied from about five seconds to sixty seconds. In fact, the residence time can be varied over a much wider range of time than from five seconds to sixty seconds as the residence time may be two minutes or three minutes.

The fuel which can be used and introduced into the plenum chamber can be a liquified petroleum gas, propane, butane, water gas, diesel in gaseous form, and the like. As previously stated, there can be admixed with a the material to be treated a solid fuel such as coal or there can be used diesel as a binder in forming the agglomerated particle to be introduced into the furnace.

In a rotary furnace, the fuel efficiency is approximately 10%. A highly efficient rotary furnace may have a fuel efficiency of 30%. With the furnace 28, I estimate that the fuel efficiency varies between approximately 60% to 85%. Again, a main reason for this difference in fuel efficiency is that it is not necessary to heat extraneous air in the furnace 28 while it is necessary to heat extraneous or carrier air in the rotary furnace. Another reason for the greater fuel efficiency of the furnace 28 is that it is not necessary to heat such a large mass as compared with the rotary furnace. The furnace 28 is more compact, less mass, smaller size, and therefore there is not a large mass of material to heat as compared with the rotary furnace. Also, there is less heat loss from the furnace 28 as compared with the rotary furnace.

As previously stated, the furnace 28 can be used to regenerate filter aids. For example, a filter aid prepared from perlite or a filter aid prepared from diatomaceous earth can be regenerated in the furnace 28 at a temperature in the range of about 1500° F. to 2000° F. This results in a saving in the processing of a filter aid and also means that it is not necessary to discard used filter aids.

In the furnace 28, it has been shown and described that the spacing between the reflector brick and the firebrick can be varied to accommodate the material 220 to be processed into the product 224. Initially, when the material 220 is introduced into the furnace 28, the spacing between the reflector brick and the firebrick is a small distance. This results in more radiant heat on the material 220. If the material 220 expands into an intermediate product 22, the spacing between the reflector brick and the firebrick is increased to accommodate the larger size. Then, near the end of the cycle or process, the spacing between the reflector brick and the firebrick is greatest to accommodate the expanded material. With this furnace, it has been noticed that it has been possible to expand perlite particles and make the particles extremely strong compared to expanded perlite particles from a rotary furnace or a verticle furnace or a stationary horizontal furnace. The expanded perlite particles from the furnace 28 were heavier than the expanded perlite particles from one of the three above-enumerated furnaces. Further, with the furnace 28, it is possible to expand perlite particles of comparatively large size into comparatively strong expanded perlite particles. This has not been accomplished in the perlite industry with a rotary furnace or a vertical furnace or a horizontal furnace.

As previously stated, the firebricks were selected so as to be as uniform as possible. A standard for uniformity was that the bricks were to weigh, substantially, the same. Also, the bricks were painted on the ends and sides with a fireproof paint so as to seal the ends and sides. Then, the combination of air and combustible gas could be introduced into the plenum and this combination flow through the brick and onto the surface of the brick where the combination was ignited and burned. In a test, it was estimated that the fuel comsumption was, with the furnace 28, in the range of 3,000,000 BTU's per ton of product, such as expanded perlite. With a rotary furnace or a vertical furnace or a stationary horizontal furnace, the fuel consumption is in the range of 4,000,000–4,500,000 BTU's per ton of expanded perlite. It is seen that there is a saving of approximately one-third to one-half of the fuel in the furnace 28 as compared with one of the other three furnaces. To assist in maintaining a long life for the firebrick, there was attached a block of porous aluminum oxide on top of the firebrick. One of the requisites for the aluminum oxide was that it would have a porosity equal to that of the firebrick.

In the furnace 28, it is seen that the adapter 80 is free to rotate, with the first circular member 30, around the outlet nozzle 78. The adapter 80 and the outlet nozzle 78 function as a swivel. The adapter 80 can rotate, completely, around the nozzle 78 along with the rotation of the first circular member 30. The gas passes through the pipe 74, mixing chamber 76, outlet nozzle 78, adapter 80, arms 82 and 84, or 190 and passes into the plenum chamber and flows through the porous brick so as to be burned on top of the firebrick. The material 220 to be processed is heated by conduction from the surface of the firebrick, by convection of gas, products of combustion, flowing from the firebrick to the material 220, and also by radiation from the reflector brick positioned above the firebrick and also above the material 220. The flowing of the mixture of air and combustible gas through the firebrick and also on top of the firebrick assists in keeping the material 220 being processed from sticking to the firebrick. The flowing gases raise or elevate the material being processed from the surface of the firebrick so as to lessen the possibility of the material sticking and adhering to the firebrick. With this method of burning the gas on the upper surface of the firebrick, it is possible to attain a temperature in the range of about 2600° F. The material 220 is heated by radiation from the reflector brick and which reflector brick or which reflector may be as close as one-quarter of an inch to the firebrick. When the material 220 is, initially, placed on the firebrick, the reflectors may be as close as one-quarter of an inch to the firebrick. With the expansion of the material 220, it is necessary to position the reflectors farther away from the firebrick so as to allow the expanded material or processed material 222 to be carried by the rotating firebrick to the outlet for the furnace 28. If the reflectors were not positioned farther away from the firebrick, then the reflectors would interfere with the movement of the material 222 being processed. In certain instances, the reflectors may be as much as one and one-half inches away from the firebrick to accommodate the material being processed.

I consider that one of the advantages of this invention is that the retention time of the material to be processed in the furnace 28 can be accurately controlled. As previously stated, the retention time can be varied from five seconds up to two or three minutes or even longer. The ability to vary the retention time makes it possible to process material in a manner which has not been previously processed. For example, if, after the particle has been expanded, the expanded particle is retained in the furnace or heat zone, the surface of the particle tends to fuse. This causes a slight shrinkage in the particle but the strength of the particle is greatly increased. Because the retention time in the furnace can be controlled, much larger particles can be expanded with the furnace 28 than with the other furnaces, such as the vertical furnace, the rotary furnace, or the horizontal furnace. Again, remember that after the particle has been expanded and if it be retained in the furnace, an annealing process or a fusing of the surface of the particle takes place to increase the strength of the particle. This creates the possibility of making high-strength, lightweight concrete blocks. In the forming of expanded or bloated particles and also in the calcining of particles with the furnace 28 and with my method, it is possible to expand and calcine materials without the necessity of drying the materials as contrasted with the conventional processing methods in a vertical furnace or rotary furnace or horizontal furnace wherein the material to be processed must be almost bone dry.

As stated, air and a gas, such as liquified natural gas or propane or butane, can be mixed and burned on top of the firebricks to realize in the temperature range of about 2600° F., and, it is conceivable, that in place of air there can be used oxygen so as to form an oxygen-natural gas mixture which can be burned on top of the firebrick. The heating process can be used for calcination of properly prepared mixtures of aluminal-silicate materials and radioaciive waste products, primarily, salt cake or sodium nitrate-nitrite complex containing cesium 137 and other radioactive products. With calcination, there is a fusion of the aluminal-silicates with the radioactive product thereby causing the radiocative produts to be encased in a glasslike matrix. The radioactive products become a solid, nonleachable form of material suitable for short term or long term storage. Again, this is of value as in many instances, the salt cake or sodium nitrate-nitrite complex containing cesium 137 and other radioactive products may be in a liquid form or may be in a liquid-solid combination or mixture. The salt cake or sodium nitrate-nitrite complex can be mixed with a calcining agent like diatomaceous earth, clay, cement, fly ash, volcanic ash, natural zeolites, pumice, and the like, to name a few and the salt cake can be used as a binder. Then, the resulting mixture can be made into agglomerated particles of a desired size and then these agglomerated particles of the salt cake and the carrier, such as diatomaceous earth or clay can be calcined and fused so that a solid results and which solid contains the radioactive materials. A contributing factor to storing the salt cake and radioactive materials in solid form is the step of agglomerating the mixture of the radioactive materials and the diatomaceous earth or clay or the like into balls or discrete units of, substantially, the same size. With the formation of these agglomerated particles of discrete size and of substantially the same dimensions, it is possible to have a precise control of the bed thickness of the particles to be processed on the firebrick. The control of the bed thickness with the control of the retention time makes it possible to carry out the calcination step and, when desirable, the bloating or expanding step on the various particles. This, in turn, permits faster and more efficient use of the heat transfer to the particles being processed. The agglomeration process also allows for the reprocessing of waste materials into useful products. An example is perlite fines can be processed into a perlite aggregate, a mixture of spent filter aid (either diatomaceous earth or perlite) and unexpanded perlite ore can be reprocessed back into a filter aid or can be processed to make a light-weight aggregate for use in concrete or a mixture of fly ash and unexpanded perlite ore can be processed to produce a light-weight aggregate or a filter aid.

Again, I consider that one of the main advantages of the furnace 28 and this method is the ability to achieve a product equal to or superior than achieved with a vertical furnace, a stationary horizontal furnace, or a rotary furnce with less fuel consumption. The fuel consumption of this furnace and method is in the range of about one-half to two-thirds of that achieved with one of those enumerated furnaces. In this regard, an article by Herbert A. Stein, "Measures for Conservation of Fuel in the Expansion of Perlite" states:

"With the high cost of fuel today, it is more important than ever to reduce the amount of fuel used in expanding perlite.

"Perlite expanding processes are often operated at very low fuel efficiency, sometimes less than 25%. Some of the reasons for this are as follows:

"1. Present-day expanders are co-current, that is, the perlite and the flame enter the expansion chamber together and leave together. This means that the hot gases leave the furnace at a higher temperature than the expanded perlite. The co-current operation is in contrast to the counter-current operation used in cement kilns and boilers, for example, where the incoming feed absorbs heat coming from the hot zone.

"2. Present-day expander tubes are uninsulated and made of metal, to operate at a lower temperature in order to avoid fusion and damage to the tube. As a result, more heat often passes through the furnace tube wall than is needed to expand the perlite.

"3. Many perlite expanding processes do not involve recovering wasted heat by using it to preheat the ore or the combustion air.

"4. Many furnaces, especially verticals, are operated with too much air flow, well in excess of what is needed for combustion. This air must be heated to the operating temperature.

"5. Many furnaces are operated at a production rate which is too low for good fuel efficiency per ton, often because the auxilliary equipment (such as cyclones, air locks, and cooling and bagging facilities) is too small to handle the higher production rate.

"6. Another cause of high fuel consumption due to too low a production rate is the use of an ore which is coarser than necessary for the intended end use of the expanded perlite."

As contrasted with the comments of Herbert A. Stein, I consider that there is not a waste of fuel with my furnace and my method. The air introduced into my furnace is used for combustion and not for conveying the products from the furnace. Therefore, there is less heat energy required as it is not necessary to heat extraneous carrier air. Also, the product is at a higher temperature, upon leaving the furnace, than the temperature of the products of combustion. The production rates of my furnace can be varied to accommodate the material to be processed and also with my furnace, used in conjunction with the agglomeration process, it is not always necessary to use cyclones, air locks, cooling and bagging facilities and the like. I question if it be possible to use agglomerated particles in a rotary furnace or a vertical furnace or a stationary horizontal furnace. I think that with my furnace there is an expansion of materials which can be processed to make a useful product.

I consider my invention to be new, useful, and unobvious.

35 USC 101 states:

"Whoever invents or discovers any new and useful process, machine, manufacture, or composition of matter, or any new and useful improvement thereof, may obtain a patent therefor, subject to the conditions and requirement of this title."

I consider my invention to be new as I do not know of another furnace or another method for processing a material to make an expanded product or a calcined product. I do not know of another furnace having upper and lower bricks and wherein a material to be processed can be placed on rotating firebricks for being heat processed and also wherein the air introduced into the furnace and the air used in my method is, essentially, the air for combustion purposes and not for carrier purposes.

I consider my invention to be useful as it can be used to expand or bloat material such as vermiculite, perlite, volcanic ash, and pumice. Also, my furnace and my method can be used for calcining materials such as diatomaceous earth, clay, titanium dioxide, cement, fly ash, volcanic ash, zeolite, perlite, vermiculite, pumice, and the like. These products can be used for horticultural purposes fly ash, storing of radioactive wastes in a solid matrix, for lightweight concrete, and the like.

35 USC 103 states:

"A patent may not be obtained through the invention is not identically disclosed or described as set forth in section 102 of this title, if the differences between the subject matter sought to be patented and the prior art are such that the subject matter as a whole would have been obvious at the time the invention was made to a person having ordinary skill in the art to which said subject matter pertains. Patentability shall not be negatived by the manner in which the invention was made."

I consider my invention to be unobvious as, again, I have not seen or heard of another furnace or method similar to my furnace and method.

In preparing this patent application, a patent search was not made but information I know in regard to a rotary furnace, a vertical furnace, a stationary horizontal furnace for processing perlite and vermiculite has been disclosed. Also, there has been called to my attention three U.S. Pat. Nos.: 2,659,521; 2,672,483; and, 2,572,484.

With the foregoing and having presented my invention, what I claim is:

1. A process for treating radioactive salt cake, said process comprising:
    a. mixing said radioactive salt cake with clay;
    b. heating said mixture to form calcined particles;
    c. in heating said mixture burning fuel in the presence of said mixture to heat said mixture to assist in forming said calcined particles;
    d. contacting said mixture with a hot surface to assist in forming said calcined particles;
    e. reflecting heat energy radiating from said hot surface toward said mixture on said hot surface to assist in forming said calcined particles; and,
    f. said calcined particles being a solid.
2. A process according to claim 1 and comprising:
    a. mixing said calcined particle with a shielding material to form a shielded calcined particle.
3. A process according to claim 1 and comprising:
    a. mixing said calcined particle with a shielding material to coat said calcined particle with said shielding material and to form a shielded calcined particle.

* * * * *